US011165233B2

(12) United States Patent
Ohtsuka et al.

(10) Patent No.: US 11,165,233 B2
(45) Date of Patent: Nov. 2, 2021

(54) ELECTRICAL CONNECTION BOX AND WIRE HARNESS

(71) Applicant: Yazaki Corporation, Tokyo (JP)

(72) Inventors: Yuichiro Ohtsuka, Shizuoka (JP); Takaaki Kakimi, Shizuoka (JP); Takao Nogaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/018,785

(22) Filed: Sep. 11, 2020

(65) Prior Publication Data

US 2021/0083464 A1    Mar. 18, 2021

(30) Foreign Application Priority Data

Sep. 13, 2019    (JP) .............................. JP2019-166781

(51) Int. Cl.
*H02G 3/08*    (2006.01)
*B60R 16/023*    (2006.01)
*H02G 3/14*    (2006.01)

(52) U.S. Cl.
CPC ......... *H02G 3/088* (2013.01); *B60R 16/0238* (2013.01); *H02G 3/14* (2013.01)

(58) Field of Classification Search
CPC .......... H02G 3/08; H02G 3/081; H02G 3/088; H02G 3/16; H02G 3/14; H05K 5/00; H05K 5/02; H05K 5/04; B60R 16/00; B60R 16/0239; B60R 16/02; B60R 16/0238; H01H 9/02; H01H 9/04

USPC ................... 174/50, 520, 59, 535, 559, 560; 439/76.1, 76.2, 949, 535; 361/600, 601, 361/679.01, 730, 752
See application file for complete search history.

(56) References Cited

U.S. PATENT DOCUMENTS

| 5,703,325 | A  | * | 12/1997 | Yamaguchi | ............ | H02G 3/088 |
|           |    |   |         |           |              | 174/50     |
| 6,545,217 | B2 | * | 4/2003  | Sato      | ........      | H02G 3/088 |
|           |    |   |         |           |              | 174/50     |
| 7,878,357 | B2 | * | 2/2011  | Yoshida   | ................ | H02G 3/081 |
|           |    |   |         |           |              | 220/4.27   |

(Continued)

FOREIGN PATENT DOCUMENTS

JP    H05-62125 U    8/1993
JP    H09-036568 A    2/1997
(Continued)

*Primary Examiner* — Angel R Estrada
(74) *Attorney, Agent, or Firm* — Sughrue Mion, PLLC

(57) ABSTRACT

An electrical connection box includes: a frame accommodating electronic components; and a lower cover located below the frame and closing a lower opening. The frame includes double walls including a first outer wall and a first inner wall and formed along the lower opening. The lower cover includes: a second outer wall located between the first outer wall and the first inner wall in a placement state; and a second inner wall formed inside the second outer wall and along the second outer wall. The first inner wall includes: a body formed in such a manner that a lower end is located between the second outer wall and the second inner wall in the placement state; and a bulge protruding toward the first outer wall from an opposed surface, being opposite to the first outer wall, of the body.

5 Claims, 4 Drawing Sheets

(56) References Cited

U.S. PATENT DOCUMENTS

| | | | | |
|---|---|---|---|---|
| 8,210,378 | B2* | 7/2012 | Takeuchi | H02G 3/14 |
| | | | | 220/4.02 |
| 8,633,383 | B2* | 1/2014 | Akahori | H01R 9/2458 |
| | | | | 174/50 |
| 8,785,775 | B2* | 7/2014 | Takeuchi | H02G 3/088 |
| | | | | 174/50 |
| 8,813,984 | B2* | 8/2014 | Satoh | H05K 5/063 |
| | | | | 220/4.21 |
| 8,915,394 | B2* | 12/2014 | I | H02G 3/088 |
| | | | | 220/378 |
| 9,099,850 | B2* | 8/2015 | Kakimi | H02G 3/088 |
| 10,411,449 | B2* | 9/2019 | Matsui | B60R 16/02 |
| 11,038,330 | B2* | 6/2021 | Kurata | B60R 16/0238 |
| 2014/0231129 | A1 | 8/2014 | Kakimi | |
| 2014/0246215 | A1 | 9/2014 | I et al. | |
| 2015/0171608 | A1 | 6/2015 | Ueyama | |

FOREIGN PATENT DOCUMENTS

| | | |
|---|---|---|
| JP | 2014-027723 A | 2/2014 |
| JP | 2014-158385 A | 8/2014 |
| JP | 2014-171319 A | 9/2014 |

* cited by examiner

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2019-166781 filed in Japan on Sep. 13, 2019.

BACKGROUND OF THE INVENTION

1. Field of the Invention

The present invention relates to an electrical connection box and a wire harness.

2. Description of the Related Art

An electrical connection box (also called a junction box, a fuse box, a relay box, or the like) has been known that is installed in a vehicle, such as an automobile, and accommodates electronic components, such as a wire harness, a fuse, and a relay, together.

Such an electrical connection box includes a housing typically formed by stacking a plurality of housing members. The housing thus has a waterproof structure at one of the housing members and the other to restrain outside water from entering the housing from between the stacked housing members. To provide the waterproof structure, double walls including an inner wall and an outer wall are formed on the one housing member, and an outer wall of the other housing member is inserted between the inner wall and the outer wall of the one housing member, thereby fitting the housing members together. In the case of a waterproof structure of an electrical connection box including a housing that includes a housing body and a lower cover disposed below the housing body, the housing body includes a peripheral wall having a double-wall structure composed of an outer wall and an inner wall, and when the lower cover is fitted to a frame, a tip of an outer wall of the lower cover is inserted between an outer wall and an inner wall of the frame (for example, see Japanese Patent Application Laid-open Nos. H9-36568, 2014-171319, 2014-158385, and 2014-27723).

When the underside of the vehicle is washed with a high-pressure washer or the like, high-pressure water may hit the electrical connection box in the engine compartment from below. In this case, water may enter a space between the inner wall and the outer wall of the housing body from the interface between the housing body and the lower cover and may further enter an interior space of the housing. It is thus desired to improve waterproofness of the electrical connection box.

SUMMARY OF THE INVENTION

An object of the present invention is to provide an electrical connection box and a wire harness that have improved waterproofness.

In order to achieve the above mentioned object, an electrical connection box according to one aspect of the present invention includes a first housing member being part of a housing accommodating at least an electronic component; and a second housing member being part of the housing, the second housing member being located below the first housing member and closing a lower opening formed at a lower end of the first housing member in a placement state of the housing, wherein the first housing member includes double walls including a first outer wall and a first inner wall, the double walls being formed along the lower opening, the second housing member includes: a second outer wall located between the first outer wall and the first inner wall in the placement state; and a second inner wall formed inside the second outer wall and along the second outer wall, the first inner wall includes: a body formed in such a manner that the lower end is located between the second outer wall and the second inner wall in the placement state; and a bulge protruding toward the first outer wall from an opposed surface of the body, the opposed surface being opposite to the first outer wall, and the bulge is formed so as to be opposite to the second outer wall in a perpendicular direction and overlap the second outer wall when viewed in the perpendicular direction in the placement state.

According to another aspect of the present invention, in the electrical connection box, it is preferable to further include an interior space defined by being surrounded with at least the first outer wall, the second outer wall, and the bulge, the interior space communicating with outside through an opening, wherein the second housing member further includes an auxiliary outer wall extending outside the second outer wall in a direction opposite to an extending direction of the second outer wall, the auxiliary outer wall being opposite to the first outer wall in the placement state, the opening is defined downward between the auxiliary outer wall and the first outer wall, and the interior space is defined inside the first outer wall and at least on a side of the first inner wall close to the bulge opposite to the first outer wall.

According to still another aspect of the present invention, in the electrical connection box, it is preferable that the second outer wall includes at least one reinforcing rib formed protruding from an opposed surface opposite to the first outer wall in the placement state.

In order to achieve the above mentioned object, a wire harness according to still another aspect of the present invention includes a routing member; and an electrical connection box including: a first housing member being part of a housing accommodating at least an electronic component; and a second housing member being part of the housing, the second housing member being located below the first housing member and closing a lower opening formed at a lower end of the first housing member in a placement state of the housing, wherein the first housing member includes double walls including a first outer wall and a first inner wall, the double walls being formed along the lower opening, the second housing member includes: a second outer wall located between the first outer wall and the first inner wall in the placement state; and a second inner wall formed inside the second outer wall and along the second outer wall, the first inner wall includes: a body formed in such a manner that the lower end is located between the second outer wall and the second inner wall in the placement state; and a bulge protruding toward the first outer wall from an opposed surface of the body, the opposed surface being opposite to the first outer wall, and the bulge is formed so as to be opposite to the second outer wall in a perpendicular direction and overlap the second outer wall when viewed in the perpendicular direction in the placement state.

The above and other objects, features, advantages and technical and industrial significance of this invention will be better understood by reading the following detailed descrip-

DETAILED DESCRIPTION OF THE PREFERRED EMBODIMENTS

Embodiments of an electrical connection box and a wire harness according to the present invention will be described in detail below with reference to the drawings. Note that the embodiments described below should not be construed to limit the present invention. Constituents of the following embodiments include constituents that can be easily replaced by those skilled in the art or constituents substantially the same as the constituents of the embodiments. Constituents of the following embodiments may be omitted, replaced, or modified in various ways without departing from the scope of the invention.

Embodiments

Figure 1:
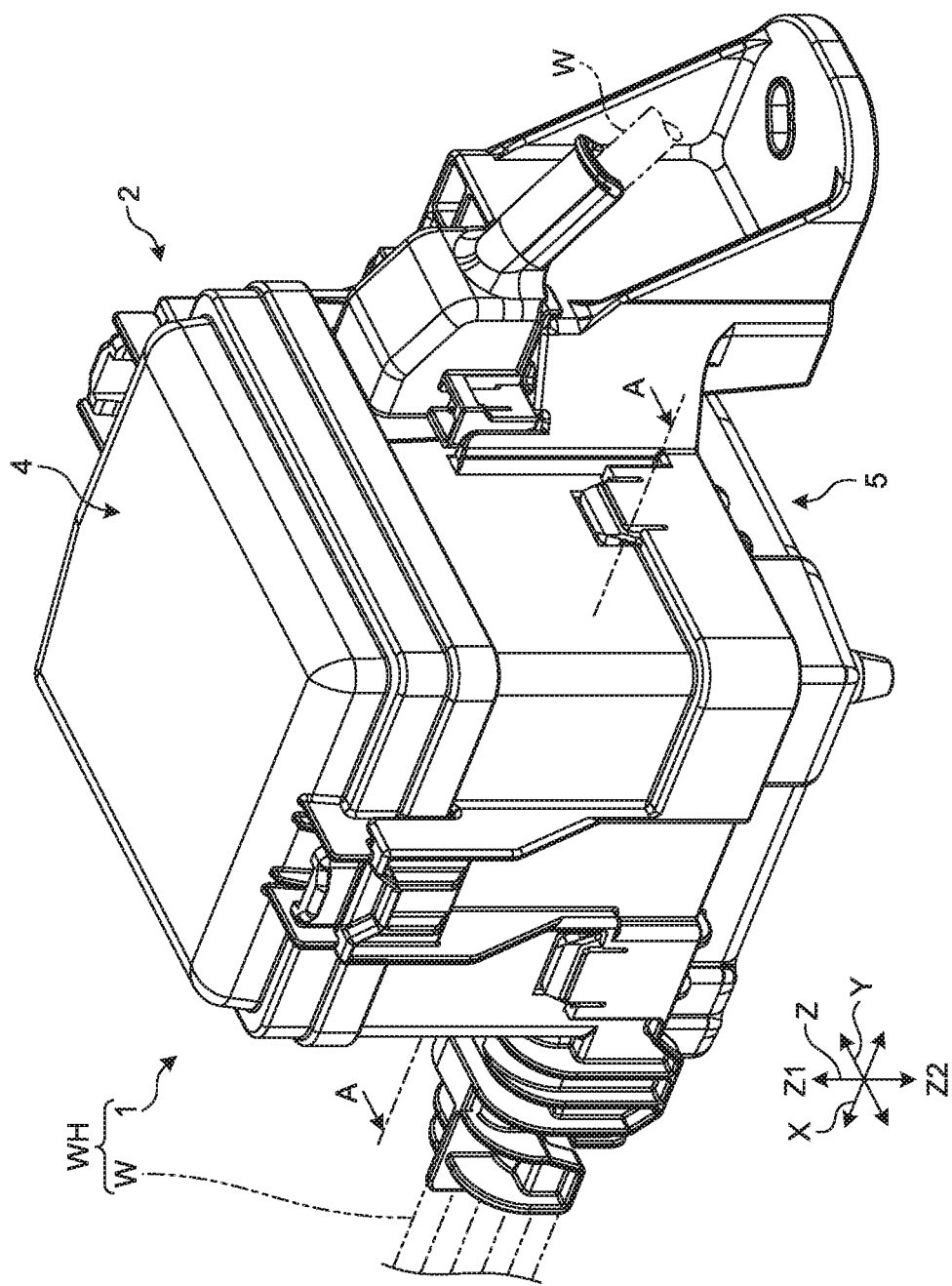
FIG. 1 is a perspective view schematically illustrating a configuration of an electrical connection box according to an embodiment.
Figure 2:
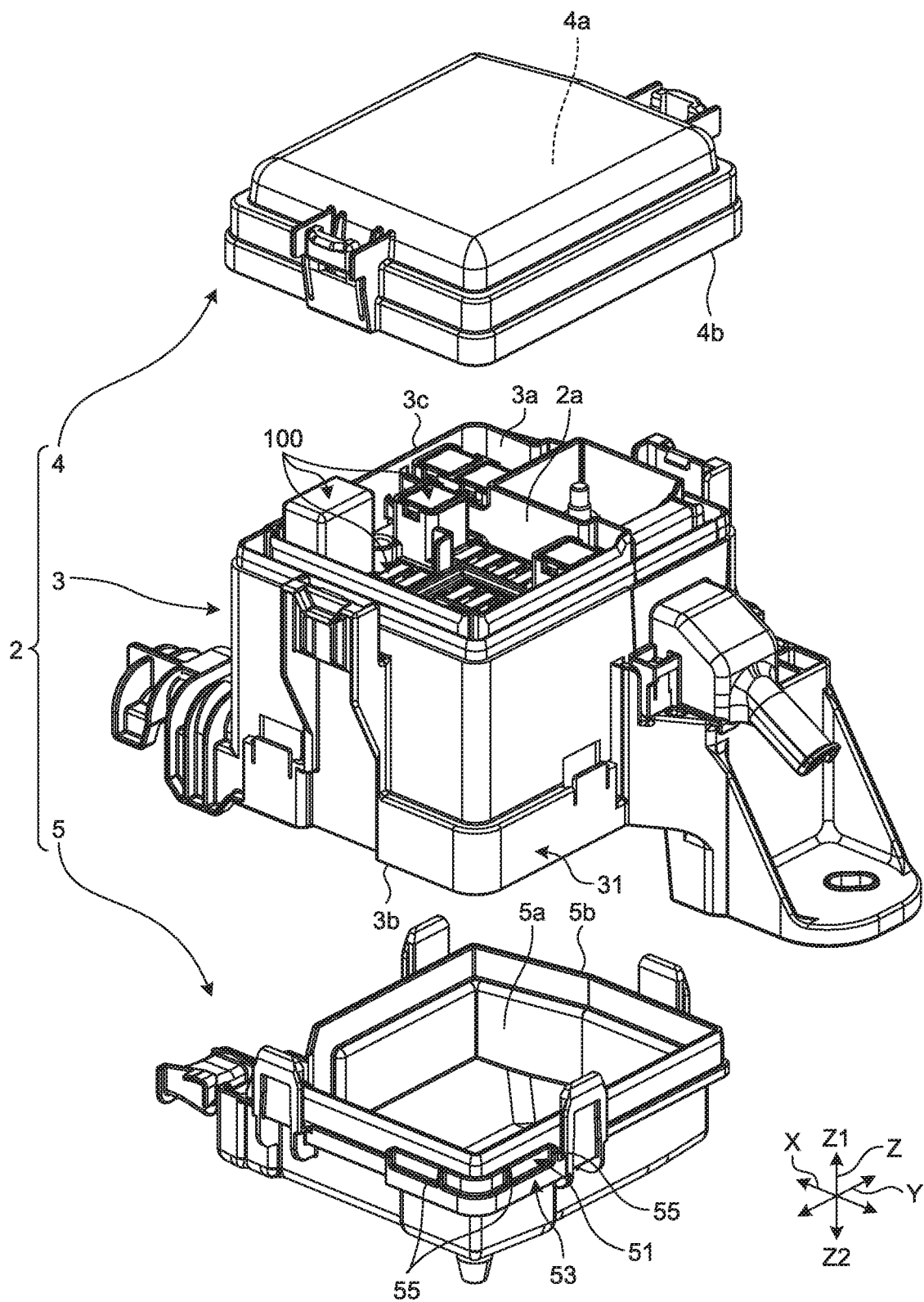
FIG. 2 is an exploded perspective view schematically illustrating the configuration of the electrical connection box according to the embodiment.
Figure 3:
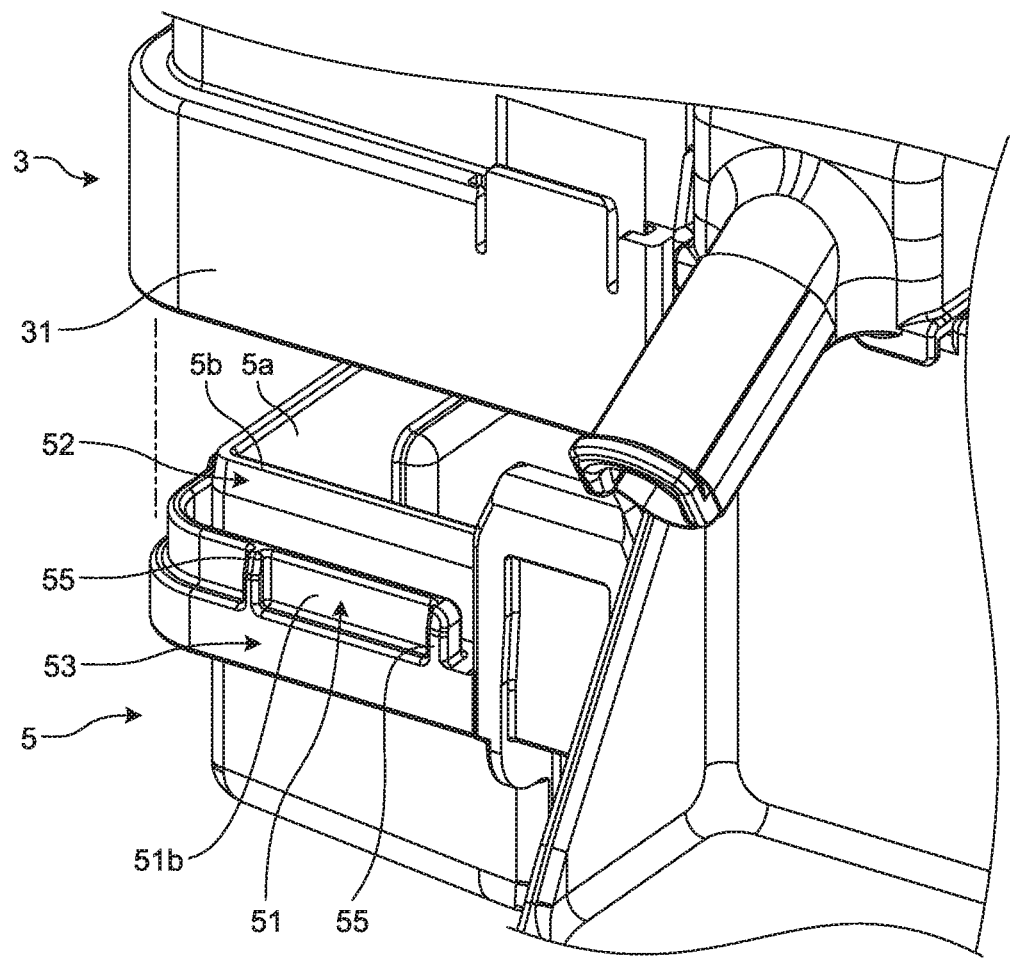
FIG. 3 is a perspective view of an enlarged main part of the electrical connection box according to the embodiment.
Figure 4:
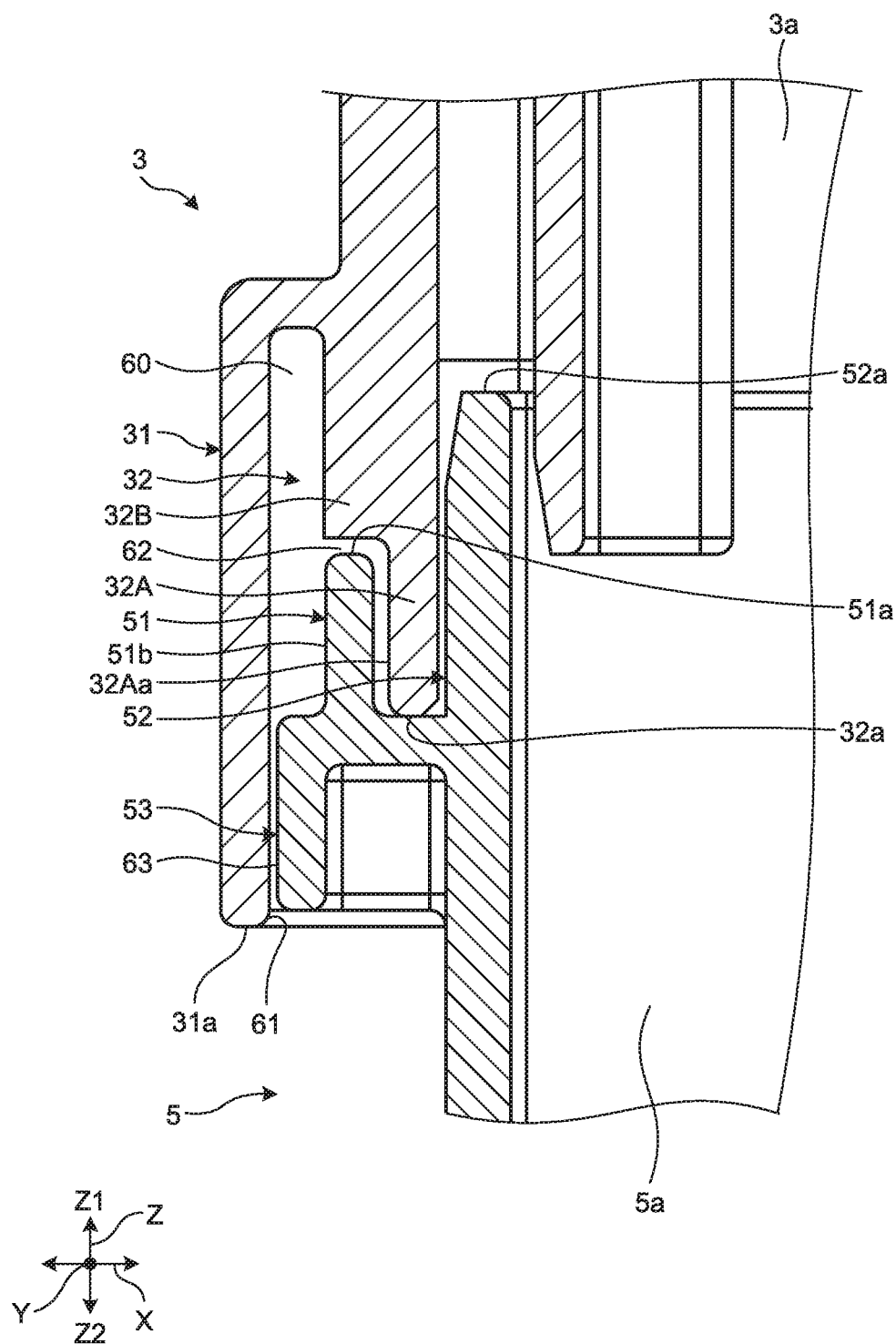
FIG. 4 is a fragmentary perpendicular sectional view of the main part of the electrical connection box according to the embodiment.

An electrical connection box and a wire harness according to an embodiment will now be described. FIG. 1 is a perspective view schematically illustrating a configuration of the electrical connection box according to the embodiment. FIG. 2 is an exploded perspective view schematically illustrating the configuration of the electrical connection box according to the embodiment. FIG. 3 is a perspective view of an enlarged main part of the electrical connection box according to the embodiment. FIG. 4 is a fragmentary perpendicular sectional view of the main part of the electrical connection box according to the embodiment. Note that FIG. 4 is a sectional view taken along line A-A in FIG. 1, and is an enlarged fragmentary view of a section of a frame body and a lower cover. In FIG. 1, a routing member is illustrated with chain double-dashed lines in a partially omitted manner. In other drawings, electronic components and routing members are omitted.

In each of the drawings, the X direction is a width direction of the electrical connection box of this embodiment. The Y direction is a depth direction of the electrical connection box of this embodiment and a direction orthogonal to the width direction. The Z direction is a perpendicular direction of the electrical connection box of this embodiment and a direction orthogonal to the width direction and the depth direction. The Z1 direction is an upward direction, and the Z2 direction is a downward direction. In this embodiment, the Z direction coincides with the vertical direction. Unless otherwise specified, each of the directions in the following description refers to a direction in the state where all constituents are fitted together and the electrical connection box is installed in a vehicle.

An electrical connection box 1 of this embodiment is installed in a vehicle (not illustrated), such as an automobile, and distributes power supplied from a power source, such as a battery, through various electronic components or the like to various electronic devices installed in the vehicle. As illustrated in FIG. 1, the electrical connection box 1 is incorporated into a wire harness WH, and accommodates together electronic components 100, such as a connector, a fuse, a relay, a branch part, and an electronic control unit, constituting a connecting component, such as a routing member W.

The wire harness WH connects one or more routing members W used for power supply and signal communication to various devices installed in the vehicle together using connectors or the like (not illustrated) for connection between the devices, for example. Note that the wire harness WH may include a grommet, a protector, a fastener, or the like, which are not illustrated. The routing member W includes, for example, a conductor (core wire) having conductivity and an insulating sheath covering the outer side of the conductor. The core wire may be a stranded wire formed by twisting a plurality of metal elemental wires or may be a metal solid wire.

The electrical connection box 1 is placed, for example, in a location exposed to an external environment, such as an engine compartment of the vehicle, and is connected between the power source, such as a battery, and various electronic devices installed in the vehicle. Note that, although the electrical connection box 1 may also be called a junction box, a fuse box, a relay bod, or the like, these boxes are collectively called an electrical connection box in this embodiment. As illustrated in FIG. 1, the electrical connection box 1 includes a housing 2 composed of a plurality of housing members. The electrical connection box 1 of this embodiment is placed in the vehicle by bringing a vehicle attaching part (not illustrated) disposed on the outer side of the housing 2 in contact with an attaching panel or the like (not illustrated) disposed on the vehicle and by fastening the vehicle attaching part and the attaching panel of the vehicle together using a fastening member, such as a bolt. The electrical connection box 1 of this embodiment is placed in the vehicle with the perpendicular direction coinciding with the vertical direction in a placement state where the housing 2 is placed in the engine compartment of the vehicle.

As illustrated in FIG. 2, the housing 2 is made from insulating synthetic resin material or the like, is formed into a box shape, and accommodates the electronic components 100 in an interior space 2a defined in the housing 2. At least some of the electronic components 100 are connected to the routing member W inserted into the interior space 2a from an opening (for example, a lower opening 3b) formed in the housing 2. The housing 2 includes a frame 3, an upper cover 4, and a lower cover 5, and has a structure in which a plurality of layers (three layers) are stacked in the order of the lower cover 5, the frame 3, and the upper cover 4 from bottom, in other words, a structure that may be split into the housing members.

The frame 3 is an example of a first housing member and part of the housing 2. As illustrated in FIGS. 1 and 2, the frame 3 has an outer periphery having a substantially rectangular shape when viewed in the perpendicular direction in the placement state. The frame 3 has an interior space 3a. The interior space 3a is part of the interior space 2a of the housing 2. The frame 3 includes a lower opening 3b formed at a lower end of the frame 3 and an upper opening 3c formed at an upper end thereof in the placement state. The frame 3 is formed into such a hollow shape that the lower opening 3b and the upper opening 3c communicate with each other through the interior space 3a in the perpendicular direction. The interior space 3a of the frame 3 according to this embodiment is divided into a plurality of sections, and boxes accommodating the electronic components 100 or the electronic components 100 as they are inserted into and held in the sections of the space. On the frame 3, double walls including a first outer wall 31 and a first inner wall 32 are formed along the lower opening 3b.

The first outer wall 31 is a part protruding outward from the frame 3 and bending and extending in the downward direction. The first outer wall 31 is disposed outside the first inner wall 32 and constitutes the double walls together with the first inner wall 32. As illustrated in FIG. 4, the first outer wall 31 of this embodiment is longer in the downward direction than the first inner wall 32. A lower end 31a located on the lower side of the first outer wall 31 serves as the lower end of the frame 3 and is located below a lower end 32a of the first inner wall 32.

The first inner wall 32 is formed inside the first outer wall 31 and along the lower end of the frame 3. The first inner wall 32 of this embodiment includes a body 32A and a bulge 32B. The body 32A is a part formed in such a manner that the lower end 32a is located between a second outer wall 51 and a second inner wall 52, which will be described later, in the placement state. The placement state includes, for example, an attachment state where the lower cover 5 is attached to the frame 3 (the same shall apply hereafter). The bulge 32B is a part protruding toward the first outer wall 31 from an opposed surface 32Aa, being opposite to the first outer wall 31, of the body 32A. The bulge 32B of this embodiment is formed so as to be opposite to the second outer wall 51 in the perpendicular direction and overlap the second outer wall 51 when viewed in the perpendicular direction in the placement state.

The upper cover 4 is part of the housing. The upper cover 4 is located above the frame 3 and closes the upper opening 3c of the frame 3 in the placement state. The upper cover 4 has an outer periphery having a substantially rectangular shape when viewed in the perpendicular direction, that is the same as (or substantially the same as) the shape of the outer periphery of the frame 3. The upper cover 4 has an interior space 4a. The interior space 4a is part of the interior space 2a of the housing 2. Thus, the interior space 2a of the housing 2 is composed of the interior space 3a of the frame 3, the interior space 4a of the upper cover 4, and an interior space 5a of the lower cover 5. The upper cover 4 includes a lower opening 4b formed at a lower end of the upper cover 4. The upper cover 4 is formed into such a lid shape that the interior space 4a and the lower opening 4b communicate with each other. The upper cover 4 when fitted to the frame 3 is engaged with the frame 3 using an engaging mechanism disposed on a side surface of the upper cover 4 while the lower opening 4b is opposite to the upper opening 3c of the frame 3 in the perpendicular direction.

The lower cover 5 is an example of a second housing member and part of the housing 2. The lower cover 5 is located below the frame 3 and closes the lower opening 3b of the frame 3 in the placement state. The lower cover 5 has an outer periphery having a substantially rectangular shape when viewed in the perpendicular direction, that is the same as (or substantially the same as) the shape of the outer periphery of the frame 3. The lower cover 5 has the interior space 5a. The interior space 5a is part of the interior space 2a of the housing 2. The lower cover 5 includes an upper opening 5b at an upper end of the lower cover 5. The lower cover 5 is formed into such a dish shape (tray shape) that the interior space 5a and the upper opening 5b communicate with each other. The lower cover 5 when fitted to the frame 3 is engaged with the frame 3 while the upper opening 5b is opposite to the lower opening 3b of the frame 3 in the perpendicular direction. The lower cover 5 includes the second outer wall 51, the second inner wall 52, and an auxiliary outer wall 53.

The second outer wall 51 is a part protruding outward from the lower cover 5 and bending and extending in the upward direction. The second outer wall 51 is formed along the upper opening 5b of the lower cover 5 and constitutes double walls together with the second inner wall 52. The second outer wall 51 is located between the first outer wall 31 and the first inner wall 32 in the placement state. The second outer wall 51 includes a plurality of reinforcing ribs 55 formed protruding from an opposed surface 51b opposite to the first outer wall 31 in the placement state (FIGS. 2 and 3). The reinforcing ribs 55 are arranged on the opposed surface 51b at regular intervals in the peripheral direction, for example.

The second inner wall 52 is formed inside the second outer wall 51 and along the upper opening 5b. As illustrated in FIG. 4, the second inner wall 52 of this embodiment is longer (higher) in the upward direction than the second outer wall 51. An upper end 52a located on the upper side of the second inner wall 52 serves as the upper end of the lower cover 5 and is located above an upper end 51a of the second outer wall 51.

The electrical connection box 1 in the placement state further has an interior space 60 defined by being surrounded with the first outer wall 31, the second outer wall 51, and the bulge 32B, the interior space 60 communicating with outside through an opening 61. The opening 61 is defined downward between the first outer wall 31 and the auxiliary outer wall 53. The interior space 60 is defined inside the first outer wall 31 and at least on a side close to the bulge 32B opposite to the first outer wall 31, of the first inner wall 32. The auxiliary outer wall 53 extends outside the second outer wall 51 in a direction opposite to the extending direction of the second outer wall 51 and is opposite to the first outer wall 31 in the placement state. The auxiliary outer wall 53 is located outside the second outer wall 51.

An assembly procedure of the electrical connection box 1 and the wire harness WH according to this embodiment will now be described. First, a worker fits each of the routing members W to a subblock to be accommodated in the interior space 3a of the frame 3 to prepare a subharness. Second, the worker inserts the subblock with the subharness into the interior space 3a from below the frame 3 and mates the subblock with a block attaching member or the like of the frame 3 to fix the subblock. Third, the worker installs the electronic components 100 in the blocks from above the frame 3 and electrically connects the electronic components 100 with the routing members W.

Fourth, the worker brings the lower cover 5 below the frame 3 and inserts the lower cover 5 upward from below into the frame 3. The worker continues inserting the lower cover 5 upward into the frame 3 until the worker cannot move the lower cover 5 further upward. This completes fitting of the lower cover 5 to the frame 3. At this time, the second outer wall 51 is located between the first outer wall 31 and the first inner wall 32. The body 32A of the first inner wall 32 is located between the second outer wall 51 and the second inner wall 52.

Fifth, the worker brings the upper cover 4 above the frame 3 and inserts the upper cover 4 downward from above into the frame 3. The worker continues inserting the upper cover 4 downward into the frame 3 until the worker cannot move the upper cover 4 further downward. This completes fitting of the upper cover 4 to the frame 3 and completes assembly of the electrical connection box 1.

A waterproof function when outside water hits the housing 2 of the electrical connection box 1 of this embodiment will now be described with reference to FIG. 4.

If high-pressure water splashes on the electrical connection box 1 upward from below, the water hits the lower side of the housing 2, that is, the side of the lower cover 5. Water hitting the interface between the frame 3 and the lower cover 5 partially moves through the opening 61 toward the interior space 60 in the upward direction. Water entering through the opening 61 adheres to, for example, wall surfaces of the first outer wall 31, the second outer wall 51, and the bulge 32B, and temporarily stays in the interior space 60. Water staying in the interior space 60 is discharged outside through the opening 61. Water adhering to the wall surface of the bulge 32B falls downward along the wall surface under the own weight of the water. A gap 62 defined between the first inner wall 32 and the second outer wall 51 is open horizontally, so that water falling downward along the wall surface of the bulge 32B is restrained from entering the gap 62 and is discharged outside through the opening 61.

As described above, in the electrical connection box 1 and the wire harness WH according to this embodiment, the first inner wall 32 of the frame 3 includes the bulge 32B formed so as to be opposite to the second outer wall 51 in the perpendicular direction and overlap the second outer wall 51 when viewed in the perpendicular direction in a state where the lower cover 5 closes the lower opening 3b of the frame 3.

With the above configuration, the gap 62 defined between the first inner wall 32 and the second outer wall 51 is changed from an upward opening to a horizontal opening. Thus, even if water enters the interior space 60 through the opening 61 and falls downward under its own weight, for example, along the opposed surface 32Aa, being opposite to the first outer wall 31, of the bulge 32B, the water can be restrained from entering the gap 62. Accordingly, waterproofness can be improved in comparison with an electrical connection box having a conventional waterproof structure.

In the electrical connection box 1 and the wire harness WH according to this embodiment, the interior space 60 is defined that is surrounded by the first outer wall 31, the second outer wall 51, and the bulge 32B, and that communicates with outside through the opening 61 in the placement state. The interior space 60 is defined inside the first outer wall 31 and on the side close to the bulge 32B opposite to the first outer wall 31 of the first inner wall 32. With this structure, even if high-pressure water splashes on the opening 61 from below and enters the interior space 60 through the opening 61, the water moves, to the wide interior space 60, through a gap 63 defined between the first outer wall 31 and the auxiliary outer wall 53. This decreases the flow rate of the water and can reduce the force of water splashing on the gap 62. Accordingly, waterproofness can be improved in comparison with an electrical connection box having a conventional waterproof structure.

In the electrical connection box 1 and the wire harness WH according to this embodiment, the second outer wall 51 includes the reinforcing ribs 55 formed protruding from the opposed surface 51b opposite to the first outer wall 31 in the placement state. With this structure, even if high-pressure water splashes on the opening 61 from below, enters the interior space 60 through the opening 61, and splashes directly on the second outer wall 51, the reinforcing ribs 55 can prevent the second outer wall 51 from falling inward.

Note that the above embodiment has been described exemplifying a case where water enters the housing 2; however, no such limitation is intended, and there may be a case of liquid other than water.

The reinforcing ribs 55 are formed on the opposed surface 51b in the above embodiment; however, no such limitation is intended, and a single reinforcing rib may be formed.

The electrical connection box and the wire harness according to the present embodiment achieve an effect of improving waterproofness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
  a first housing member being part of a housing accommodating at least an electronic component; and
  a second housing member being part of the housing, the second housing member being located below the first housing member and closing a lower opening formed at a lower end of the first housing member in a placement state of the housing, wherein
  the first housing member includes double walls including a first outer wall and a first inner wall, the double walls being formed along the lower opening,
  the second housing member includes:
    a second outer wall located between the first outer wall and the first inner wall in the placement state; and
    a second inner wall formed inside the second outer wall and along the second outer wall,
  the first inner wall includes:
    a body formed in such a manner that the lower end is located between the second outer wall and the second inner wall in the placement state; and
    a bulge protruding toward the first outer wall from an opposed surface of the body, the opposed surface being opposite to the first outer wall, and
  the bulge is formed so as to be opposite to the second outer wall in a perpendicular direction and overlap the second outer wall when viewed in the perpendicular direction in the placement state.

2. The electrical connection box according to claim 1, further comprising:
  an interior space defined by being surrounded with at least the first outer wall, the second outer wall, and the bulge, the interior space communicating with outside through an opening, wherein
  the second housing member further includes an auxiliary outer wall extending outside the second outer wall in a direction opposite to an extending direction of the second outer wall, the auxiliary outer wall being opposite to the first outer wall in the placement state,
  the opening is defined downward between the auxiliary outer wall and the first outer wall, and
  the interior space is defined inside the first outer wall and at least on a side of the first inner wall close to the bulge opposite to the first outer wall.

3. The electrical connection box according to claim 1, wherein
  the second outer wall includes at least one reinforcing rib formed protruding from an opposed surface opposite to the first outer wall in the placement state.

4. The electrical connection box according to claim 2, wherein
the second outer wall includes at least one reinforcing rib formed protruding from an opposed surface opposite to the first outer wall in the placement state.

5. A wire harness comprising:
a routing member; and
an electrical connection box including:
  a first housing member being part of a housing accommodating at least an electronic component; and
  a second housing member being part of the housing, the second housing member being located below the first housing member and closing a lower opening formed at a lower end of the first housing member in a placement state of the housing, wherein
the first housing member includes double walls including a first outer wall and a first inner wall, the double walls being formed along the lower opening,
the second housing member includes:
  a second outer wall located between the first outer wall and the first inner wall in the placement state; and
  a second inner wall formed inside the second outer wall and along the second outer wall,
the first inner wall includes:
  a body formed in such a manner that the lower end is located between the second outer wall and the second inner wall in the placement state; and
  a bulge protruding toward the first outer wall from an opposed surface of the body, the opposed surface being opposite to the first outer wall, and
the bulge is formed so as to be opposite to the second outer wall in a perpendicular direction and overlap the second outer wall when viewed in the perpendicular direction in the placement state.

* * * * *